United States Patent Office 3,178,969
Patented Apr. 20, 1965

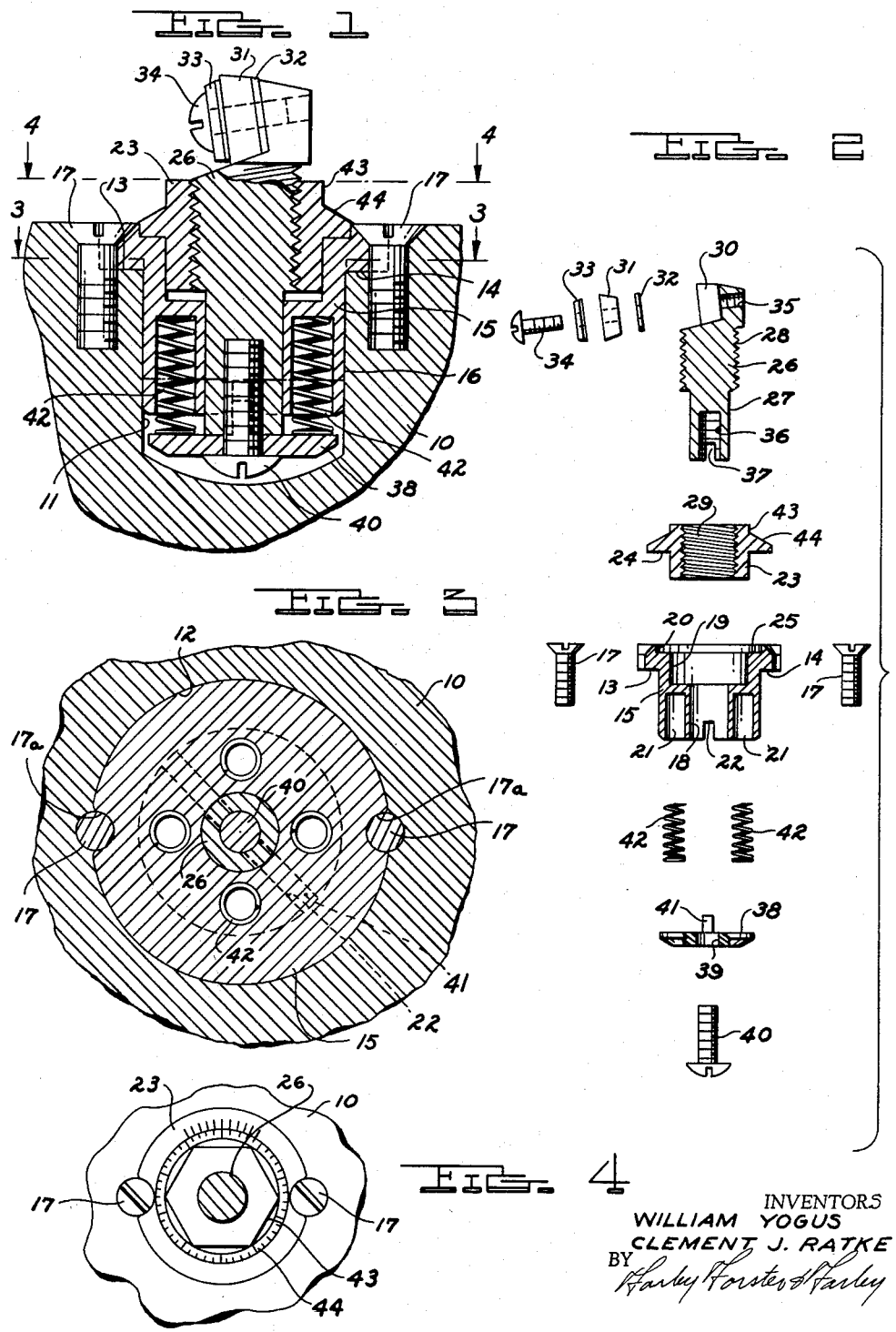

3,178,969
ADJUSTABLE TOOL INSERT
William Yogus, Birmingham, and Clement J. Ratke, Huntington Woods, Mich., assignors to The Valeron Corporation, Detroit, Mich., a corporation of Michigan
Filed Sept. 27, 1962, Ser. No. 226,613
7 Claims. (Cl. 77—58)

This invention relates to an adjustable tool insert for boring bars or the like. Its principal features include hole installation in the boring bar, readily accesssible precise dial adjustment at the outer face of the insert which requires no loosening of bolts, screws, or other retainers, together with a tensioned mounting which eliminates all back lash in the adjusting means.

The provision of these features and other objects are more fully described with reference to a preferred embodiment of the invention illustrated in the drawings wherein:

FIGURE 1 is a fragmentary sectional view passing through the axis of the insert as assembled and installed in a boring bar;

FIGURE 2 is a reduced scale exploded view of the various component parts of the insert assembly per se;

FIGURE 3 is a sectional view taken along the line 3—3 of FIGURE 1; and

FIGURE 4 is a sectional view taken along the line 4—4 of FIGURE 1.

Referring to FIG. 1, a boring bar 10 is prepared for the insert by the provision of an accurate cylindrical mounting hole 11 which need not and preferably does not extend through the bar but only to a clearance depth for the insert as shown. A counterbore 12 at the top of the mounting hole provides an annular shoulder seat 13 against which the annular shoulder 14 of the main outer bushing 15 registers when its closely fitting cylindrical portion 16 is inserted and moved to its lowermost position. Retainer screws 17 engage opposed semi-screw recesses 17a at the margin of the shoulder 14 holding the registration surfaces 13–14 in firm engagement as well as holding the bushing 15 of the insert against rotation relative to the boring bar. The insert bushing 15 is provided with an accurately located and sized central through bearing aperture 18, a concentric accurately located and sized counterbore 19, a second counterbore 20, and four equally spaced spring pockets 21 as well as a transverse slot 22 (shown in FIGS. 1 and 2 forty-five degrees rotated from its true position extending midway between the spring pockets as accurately shown in FIG. 3). A dial adjustment sleeve 23 is adapted to fit snugly but rotatably within the counterbore 19 with an annular shoulder 24 registering against the annular surface 25 at the bottom of the counterbore 20. A cartridge body 26 is provided with a cylindrical lower end 27 closely fitting the bearing 18 in the bushing and having a threaded portion 28 engaging a through mating thread 29 in the dial adjustment sleeve 23. A tool pocket 30 is provided in the head of the cartridge body for accommodating a suitable tool which in the present illustration is a throwaway tungsten carbide insert 31 held between a shim sheet 32 and chip deflector 33 held in assembled position by a hold-down screw 34 passing through these elements and engaging a threaded hole 35 in the cartridge body. The bottom of the cartridge body is provided with a threaded hole 36 and a transverse slot 37 matching the slot 22 in the bushing 15. A retainer disc 38 is provided with a through hole 39, for accommodating passage of a retainer screw 40, and a pair of projecting retainer keys 41 for engaging simultaneously the slots 22 in the bushing and 37 in the cartridge body thereby holding these elements against relative rotation. Four compression springs 42 reacting between the bushing 15 and retainer 38 load the retainer away from the bushing thereby holding the cartridge body 26 connected thereto by a retainer screw 40 in a downward position taking up all back lash between the threads 28–29 and holding the collar 24 of the dial adjustment sleeve firmly against the seat 25 in the bushing.

By providing close fits in the respective cylindrical mating surfaces, as well as in the adjustment threads 28–29, and suitably loaded compression springs 42, a very rigid assembly may be provided notwithstanding the absence of any locking device for preventing rotation of the dial adjustment sleeve 23. A hex end 43 is preferably provided above a graduated dial surface 44 facilitating the application of an adjustment wrench which may be employed to accurately adjust the axial position of the cartridge body relative to the boring bar at any time without loosening any retaining means.

While the present illustration of the preferred embodiment is shown and described above in detail as applied to a throw-away cutter, the invention is applicable to other tools requiring accurate adjustment such as burnishing tools and locating buttons and it will be understood that numerous other modifications might be resorted to without departing from the scope of our invention as defined in the following claims.

We claim:

1. In combination a tool holder, a cylindrical bore in said tool holder, an axially aligned counterbore providing an annular seat, a bushing having a cylindrical portion closely fitting said cylindrical bore and a collar adapted to engage said seat, means securing said bushing rigidly against rotation relative to said tool holder with said collar engaging said seat positively establishing the axial position of said bushing relative to said tool holder, a cylindrical bearing aperture and concentric cylindrical counterbore in said bushing, a tool cartridge body having a cylindrical portion closely fitting said cylindrical bearing aperture for guided axial adjustment therein, an externally threaded portion on said cartridge body, an internally threaded rotatable adjustment sleeve engaging said threaded portion having a cylindrical surface closely fitting within said concentric cylindrical counterbore and an annular shoulder axially engaging said collar, resilient means loading said adjustment sleeve shoulder axially against said collar, and means preventing relative rotation between said cartridge body and said bushing.

2. The combination set forth in claim 1 wherein said cylindrical bore comprises a blind hole of limited depth.

3. The combination set forth in claim 1 wherein said cylindrical bore comprises a blind hole of limited depth, and said means securing said bushing is located at the exposed collar side of said bushing.

4. The combination set forth in claim 1 wherein said cylindrical bore comprises a blind hole of limited depth, and said means securing said bushing comprises screw means partially engaging both the collar of said bushing and the adjacent wall of said tool holder formed by said counterbore.

5. The combination set forth in claim 1 wherein said resilient means comprises a plurality of spring pockets in said bushing, a coiled compression spring in each of said pockets extending beyond the end of said bushing and a retainer secured to said cartridge engaging compressed exposed ends of said compression springs.

6. The combination set forth in claim 1 wherein said resilient means comprises a plurality of spring pockets in said bushing laterally disposed relative to said bearing aperture, a coiled compression spring in each of said pockets extending beyond the end of said bushing, and a retainer secured to said cartridge engaging compressed exposed ends of said compression springs, and said means preventing relative rotation comprising aligned slots in adjacent ends of said cartridge and bushing, and key means on said retainer simultaneously engaging said slots.

7. The combination set forth in claim 1 wherein said adjustment sleeve is provided with an exposed dial face and a portion extending beyond said face adapted for rotative engagement by an adjustment tool.

References Cited by the Examiner

UNITED STATES PATENTS

| | | |
|---|---|---|
| 2,125,005 | 7/38 | Jearum. |
| 2,558,815 | 7/51 | Briney. |
| 2,998,736 | 9/61 | Cloutier et al. _____ 77—58 |
| 3,011,370 | 12/61 | Williams _____ 77—58 |
| 3,116,653 | 1/64 | Lombardo _____ 77—58 |

FOREIGN PATENTS 862,541  3/61  Great Britain.

OTHER REFERENCES

De Vlieg Catalog No. 56, published 1956, page 4, Fig. 10 relied on. (Copy in Div. 58, 77—58.36.)

WILLIAM W. DYER, Jr., *Primary Examiner.*

JOHN C. CHRISTIE, LEON PEAR, *Examiners.*